United States Patent [19]

Sterenberg

[11] Patent Number: 5,201,249
[45] Date of Patent: Apr. 13, 1993

[54] MULTI-PURPOSE INDEXING TURNTABLE

[75] Inventor: Bruce A. Sterenberg, Caledonia, Mich.

[73] Assignee: Progressive Blasting Systems, Grand Rapids, Mich.

[21] Appl. No.: 841,339

[22] Filed: Feb. 25, 1992

[51] Int. Cl.⁵ .................. B23B 29/24; F16H 37/06; A47B 11/00
[52] U.S. Cl. .................. 74/825; 74/813 R; 74/814; 74/661; 108/13 G; 108/20; 414/754
[58] Field of Search .............. 74/813 R, 814, 816, 74/817, 813 C, 813 L, 825, 661, 16, 69, 22 R, 84 R, 393; 108/13 G, 20; 414/754

[56] References Cited

U.S. PATENT DOCUMENTS

| | | | |
|---|---|---|---|
| 2,086,838 | 7/1937 | Appleberg . | |
| 2,965,208 | 8/1957 | Forster et al. . | |
| 3,143,792 | 5/1962 | Swanson et al. . | |
| 4,189,963 | 2/1980 | Sano et al. | 74/816 |
| 4,302,870 | 12/1981 | Schalles et al. | 74/813 L |
| 4,520,595 | 6/1985 | Diener | 74/816 X |
| 4,644,825 | 2/1987 | Yamazaki | 74/813 L |
| 4,723,378 | 2/1988 | Van Kuiken | 51/424 |
| 4,742,614 | 5/1988 | Mack et al. | 74/817 X |
| 4,780,027 | 10/1988 | Van Kuiken | 406/25 |
| 4,787,128 | 11/1988 | Wickham | 74/813 L |
| 4,882,881 | 11/1989 | Van Kuiken | 51/426 |
| 5,054,991 | 10/1991 | Kato | 414/583 |
| 5,085,558 | 2/1992 | Engelbrecht | 414/754 X |
| 5,159,846 | 11/1992 | Warner | 74/69 |

FOREIGN PATENT DOCUMENTS

| | | | |
|---|---|---|---|
| 0045835 | 3/1983 | Japan | 74/816 |
| 392484 | 1/1974 | U.S.S.R. | 74/816 |

Primary Examiner—Vinh T. Luong
Attorney, Agent, or Firm—Price, Heneveld, Cooper, DeWitt & Litton

[57] ABSTRACT

A turntable for selectively accommodating different types of workpieces in which the system is designed for combining two turntables into one for handling two different workpieces which are rotated by two different motors. Preferably, one of the motors is connected to one of the tables for rotating the table continuously at a slow speed for treating large parts. The turntable is adapted to be selectively arranged for a second motor to drive a second table at incremental positions so as to index smaller parts for treatment. One drive shaft of the two motors is located within the other drive shaft which is hollow.

13 Claims, 2 Drawing Sheets

MULTI-PURPOSE INDEXING TURNTABLE

This invention relates to a multi-purpose turntable system for supporting and positioning different types of workpieces on which operations such as peening, thermal plasma spraying, and the like are to be performed. More specifically, in a preferred aspect of this invention, this invention relates to a turntable for selectively positioning smaller parts that require indexing or larger parts which are continuously rotated as the part is being shot peened.

BACKGROUND OF THE INVENTION

In the processing of metal turbine engine parts including turbines which have a number of air foils on the outer periphery and which are treated by blasting each of the air foils to peen the surfaces thereof, a problem has existed in the versatility of the equipment used for supporting and rotating the parts to be processed. The processing equipment, particularly for blasting the parts by shot peening, requires a large compartment in which is mounted a robot that controls the position of the blasting gun or guns. Associated with this blasting equipment is the robot, the peening media handling system and other essential components all of which are extremely expensive. Examples of such equipment are disclosed in U.S. Pat. Nos. 4,723,378; 4,780,027; and 4,882,881. Within each of these enclosures as disclosed in the above patents is generally located a turntable for rotating the workpiece as it is being blasted or otherwise treated such as by thermal plasma spray. Such turntables are by themselves quite expensive. Heretofore, if types of workpieces are to be treated such as by shot peening, a compartment with all of the associated robots and blasting equipment have been provided for each workpiece or some arrangements had to be made for replacing the turntables in the compartment. Obviously, because of the cost of the blasting or other processing equipment and robots, it has been desirable to use the same compartment, processing equipment and the robots for processing each different type of workpiece.

An example of a need for processing different types of parts, referred to above, is the processing of smaller parts such as smaller turbine engine parts and larger turbine engine parts on the same turntable. The smaller turbines have a plurality of air foils which require extremely accurate indexing of the air foils in order that the robot-controlled blasting guns can accurately shot peen the surfaces of the foils or blades of a turbine. On the other hand, large workpieces or parts frequently do not require indexing, but are continuously rotated as the surfaces of the parts are shot blasted.

SUMMARY OF THE INVENTION

In accordance with this invention, a multi-purpose turntable system is adapted for handling both the smaller parts which require accurate indexing and also large parts which are processed as they are continuously rotated.

The turntable used primarily for indexing smaller parts, can be used to continuously spin smaller parts. Also, the table used primarily for continuously spinning larger parts can be used for less accurate (say −1-2 degrees) indexing of larger parts.

My invention includes a first table means for supporting a first type of workpiece and a second table means for supporting a different type of workpiece. Two separate motors are provided for selectively driving the first table means or the second table means. The first drive motor is operatively connected to a hollow shaft which selectively drives the first table means. A second shaft extends through the hollow shaft and selectively drives the second table means independently of the first motor. Thus, the turntable is adapted to be utilized to drive either the first table means or the second table means by a simple change.

The above referred to change making possible the driving of either the first or second table means by different motors is made possible by extending the inner shaft through the table means which is driven by the first motor and attaching thereto a table member that is disconnected to the table driven by the first motor. As a result, the second motor which can be an accurate indexing type of motor can rotate a workpiece at very small increments. On the other hand, the table member which supports the workpiece which requires indexing can be removed and the first motor drives its table means through the hollow shaft.

My invention thus provides for a turntable that is sufficiently versatile for supporting and rotating different workpieces in different modes; for example, a workpiece at increments of rotation by an indexing type of motor or workpieces continuously rotated by a continuously rotating motor. This results in significant savings in the cost of equipment and also the time and cost involved in substituting one turntable for another.

Other features and aspects of the invention, as well as other benefits of the invention, will readily be ascertained from the more detailed description of the invention which follows.

DESCRIPTION OF THE PREFERRED EMBODIMENT

Figure 1:
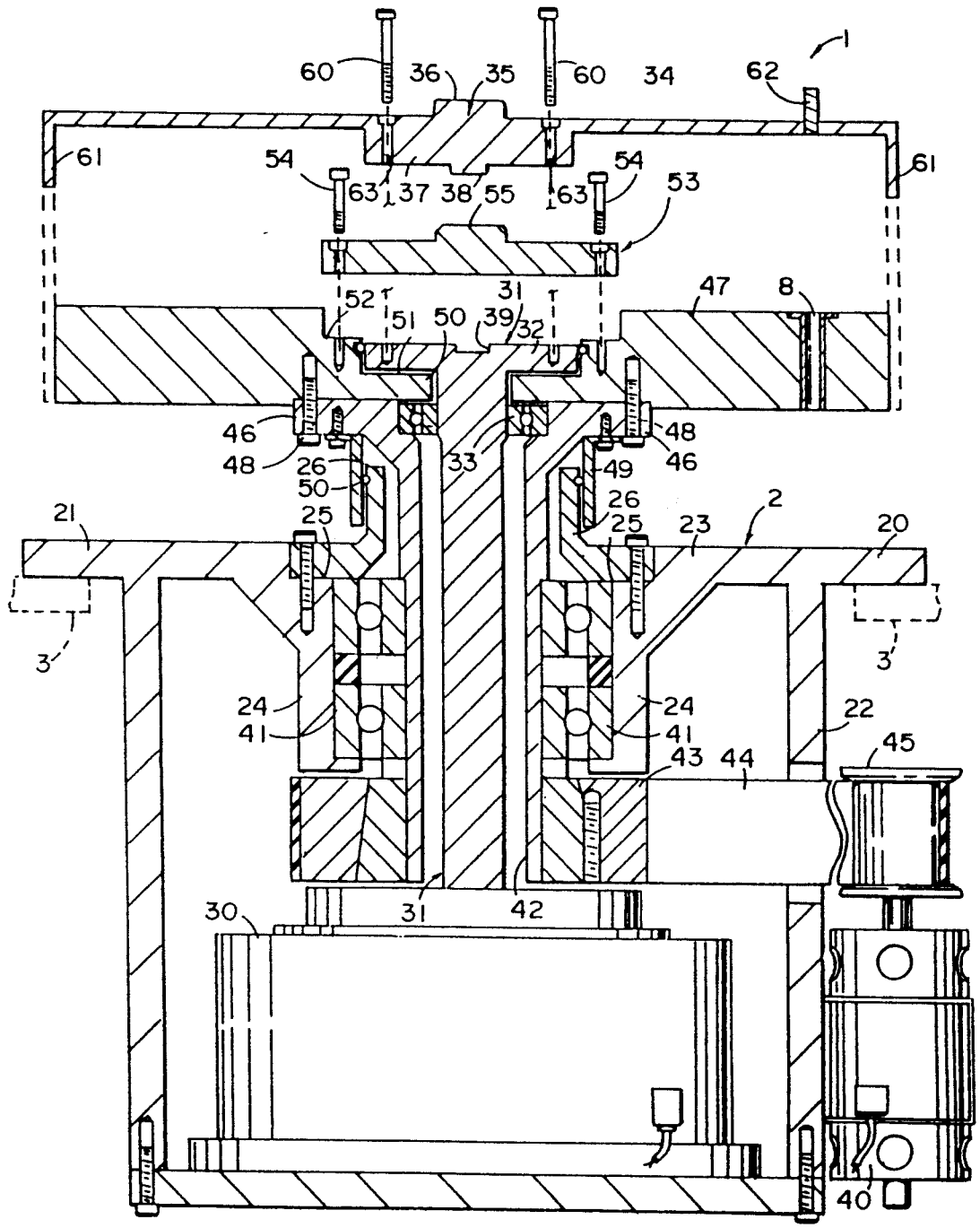
FIG. 1 is a side elevational view disclosing all the alternate parts of my turntable which parts can be used for changing the mode of my turntable.

Referring to FIG. 1, reference numeral 1 designates all of the parts required to operate the turntable selectively by one of two modes. These parts include spindle frame 2 mounted on a support frame 3. The spindle frame 2 includes the flanges 20 and 21 resting on the support frame 3 and supporting a housing 22 in which is located the index drive motor 30. A flange 24 extends downwardly from the top wall 23 of housing 22, forming a bearing housing for the bearings 41. Top wall 23 has a recess 25 in which is secured the collar 26 extending upwardly from the frame 2 for the purpose which will be described hereinafter.

The bearings 41 support a hollow spindle or shaft 42, the lower end on which is mounted the pulley 43 driven by a belt 44 through the pulley 45 which in turn is driven by the motor 40. The pulley 45 can be driven either directly by the motor or through a gear reducer (not shown).

The top end of the hollow shaft or spindle includes a flared flange 46 supporting a first table member 47 which preferably is a circular table extending radially outwardly from the axis of the hollow shaft or spindle 42. Table 47 is attached to the flared flange 46 of the hollow shaft or spindle 42 by the bolts 48. The hollow shaft or spindle 42 when rotated by first motor 40 rotates table element 47.

At the flared upper end of the hollow shaft or spindle 42 is a collar 49 attached to the lower surface of flange 46. This collar 49 is spaced a very small distance from the upwardly extending collar 26. Between the two collars 26 and 49 is located the seal 50. The two collars 49 and 26 with the seal in between prevents any dirt or other debris from falling into the bearings 41.

The first table element 47 includes an opening 50 receiving the shaft 31 which extends through the interior of the hollow shaft or spindle 42 from the index drive motor 30. Above the opening 50 are the step recesses 51 and 52. Recess 51 receives the flange 32 located at the upper end of the shaft 31. The shaft 31 with its upper flange 32 is freely rotatable within the recess 51 by means of the bearings 33 mounted between the hollow shaft 42 and the shaft 31.

All of the elements and parts as described above remain regardless of whether the turntable is to be rotated by the first motor 40 or second drive motor 30. In addition to such parts, FIG. 1 discloses the interchangeable table elements 53 utilized when the table 47 is to be driven by the first motor 40, and the table element 34 which is utilized when the table is to be rotated and indexed by the second drive motor 30. It should be understood that either of the table elements 34 or 47 are utilized, one for each mode of operation, and therefore both of them cannot be utilized at any one time.

Figure 2:
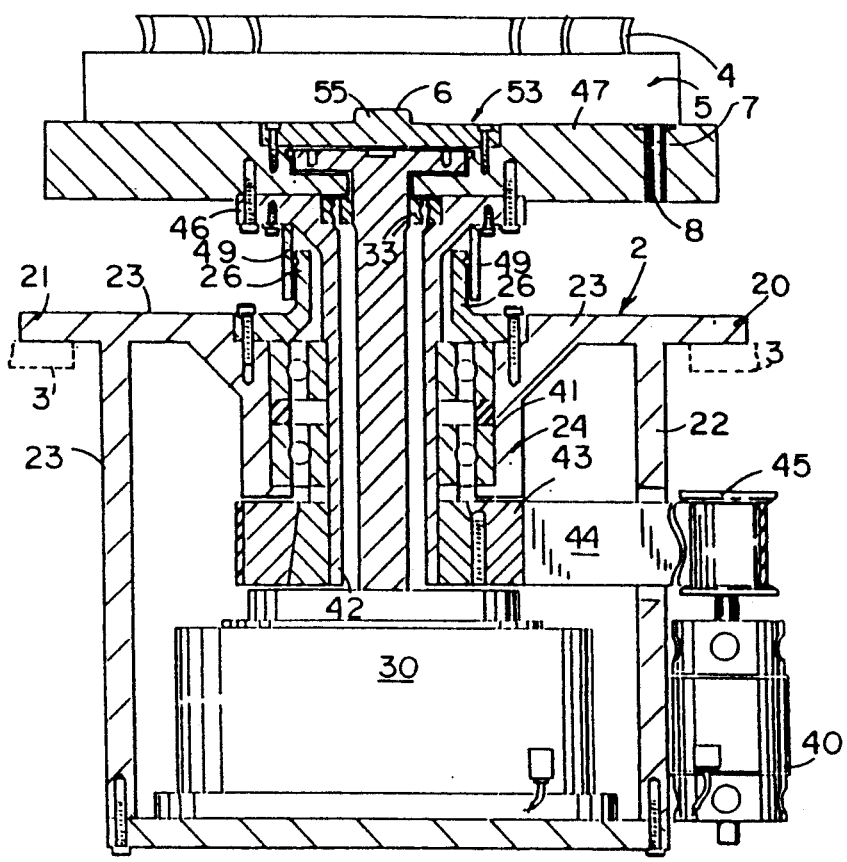
FIG. 2 is a side elevational view of the turntable of FIG. 1 in which one of the table members of FIG. 1 is eliminated whereby the turntable is in the mode whereby a first motor rotates workpiece continuously.

FIG. 2 discloses the arrangement in which a table element or tooling interface member 53 is utilized particularly for continuously rotating the table. In the preferred embodiment, the continuous rotation is utilized when the workpiece 4 (FIG. 2) is to be treated by shot peening or any other such treatment. Specifically, table element 53 is utilized for larger parts which can be slowly but continuously rotated as the part is treated. In this embodiment, as disclosed in FIG. 2, the table element 53 is secured within the recess 52 by the bolts 54. Table element 53 has a protrusion 55 that provides a tooling interface with fixture 5 when it is received in the centered recess 6 of the fixture 5. Fixture 5 includes a pin 7 extending into the opening 8 located radially outwardly of the centered recess 6. The centered recess 6 and pin 7 establish the position of the fixture on which the workpiece 4 is mounted.

The arrangement as depicted in FIG. 2 provides for the first mode of operation in which the motor 40 rotates the hollow shaft or spindle 42 which in turn rotates the first table element 47 to which the intermediate table element 53 is secured. As a result, first motor 40 continuously rotates fixture 5 and workpiece 4 as the workpiece 4 is being treated.

Figure 3:
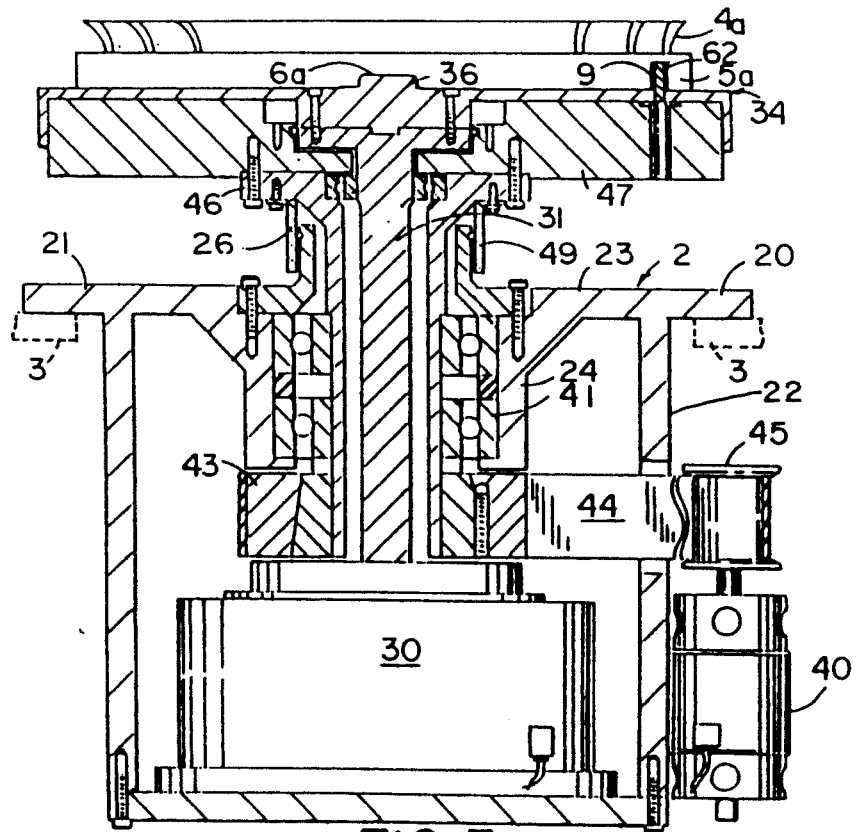
FIG. 3 is a side elevational view of the turntable of FIG. 1 in a second mode whereby the table member eliminated in FIG. 2 is disclosed supporting another type of workpiece which is rotated in increments by an indexing motor.

When it is desirable to rotate a table in increments by the index drive motor 30, the second table element 34 is utilized instead of the table element 53. FIG. 3 shows such an arrangement.

Both FIGS. 1 and 3 disclose the second table element 34 as having a centrally located enlarged portion 35 which includes an upwardly extending protrusion 36 and a downwardly extending protrusion 37 which in turn has a downwardly extending protrusion 38 received in the recess 39 (FIG. 3) located centrally in the shaft 31. It will be noted in FIG. 3 table element 34 is secured within the recess 52 to the flange 32 by means of the bolts 60. Second table element 34 includes a downwardly extending peripheral flange 61 which extends over the outer edge of the table element 47. Sufficient space is provided between table element 34 and table element 47 permitting the table element 34 to rotate relative to table element 47. Table element 34 also has a pin 62 extending upwardly into an opening 9 of the fixture 5a which supports the workpiece 4a. It should be evident that fixture 5a is properly positioned on second table element 34 by means of the pin 62 and the pilot protrusion 36 located in the centrally located recess 6a of the fixture 5a.

With the arrangement as disclosed in FIG. 3, the second drive motor 30 is operated to drive the shaft 31 which is connected to the table element 34. Thus, the second drive motor 30, which is an index motor, rotates the fixture 5a and workpiece 4a in very accurate increments as determined by the index drive motor which preferably is of the type sold by NSK Nippon Seiko under the trademark Megatorque Motor ™. It should be understood that this index drive motor is preferred because of the very accurate indexing requirement for treating the closely spaced surfaces of the blades of the workpiece. Such accuracies are within ±50 arc seconds on parts which weigh up to 500 pounds. On the other hand, when the turntable is utilized with the first table element 47 being driven by first motor 40, the table is turned at 0 to 20 rpm with parts, weighing up to 2000 pounds. The present invention is capable of handling either of these two parts by designing the two turntables into one.

OPERATION

Having described all the elements and parts of my invention, both in relation to FIGS. 1, 2, and 3, the operation of my unique turntable should be evident. Referring to FIG. 2, as previously disclosed, it is arranged in a first mode for treating workpieces by continuously rotating a workpiece at a relatively low rpm. This is accomplished by attaching the auxiliary metal piece 53 within the recess 52 of the table element 47 by means of the bolts 54 and then supporting the fixture 5 and workpiece 4 on the first table element 47. With the arrangement as disclosed in FIG. 2, the first motor 40 continuously drives the hollow shaft 42 by means of the pulleys 43 and 45 and belt 44, the shaft 42 being rotatably supported by the bearings 41.

In the arrangement or mode of FIG. 3, only the first table element 34 is secured to shaft 31 by locating the protrusion 37 in the recess 52 of table element 47 and securing the central protrusion 37 to the flange 32 of the shaft 31. The securement is accomplished by the bolts 60 extending through openings 63 in the central enlarged portion 35. Having secured table element 34 to the flange 32 of the shaft 31 the table element 34 and fixture 5a supporting the workpiece 4a are rotated by the second motor 30 in increments relative to table 47 which is stationary. The increments and timing of rotation is determined by the position of the blades of the workpiece 4a which is set by the second drive motor 30 which is an index drive motor.

It should be understood after reading the foregoing description that the invention is not necessarily limited to all the specific details described therein. Modification of certain features of the preferred embodiment which do not effect the overall basic function and concept of the invention may be made by those skilled in the art without departing from the spirit and scope of the invention as defined in the appended claims.

I claim:

1. A turntable system for selectively accommodating different types of work pieces comprising:
   a first table means for supporting one of said work pieces;
   a second table means for supporting another of said work pieces;
   support means for rotatably supporting said first and second table means;
   drive means for rotating said first and second table means;
   said drive means including a first drive motor and a second drive motor;
   a hollow shaft operatively connecting said first drive motor to said first table means for rotatably driving said first table means; and
   a second shaft extending through said hollow shaft and selectively operatively connecting said second motor to said second table means for rotatably driving said second table means independently of said first motor.

2. The turntable system of claim 1 in which said first table means includes a first table extending radially from said hollow shaft to provide a support surface for a one of said work pieces;
   said second shaft extending through an opening in said first table;
   said second table means including a table member removably and selectively connected to said second shaft and including a surface for supporting one of said work pieces; and
   said table member when connected to said second shaft being independently rotatable relative to said first table.

3. The turntable system of claim 2 in which said first table includes a centrally located recess;
   said second shaft including a radially extending flange at the top end thereof located in said recess; and
   means for selectively removably connecting said table member to said flange.

4. The turntable system of claim 3 in which said flange has an upper surface spaced from said support surface of said first table to provide a space in said recess above said flange and a tooling interface member is selectively located in said space in said recess and connected to said first table for rotation by said first motor for treating one of said work pieces mounted on said first table means.

5. The turntable system of claim 3 in which said table member when connected to said flange extends radially over said first table and is rotatable relative to said first table by said second motor.

6. The turntable system of claim 3 in which said flange has an upper surface spaced from said support surface of said first table to provide a space in said recess above said flange and said means for selectively connecting said table member to said flange includes a protrusion extending downwardly from said table member into said space in said recess; and
   means for selectively releasably connecting said protrusion to said flange.

7. The turntable system of claim 4 in which said means for selectively removably connecting said table member to said flange includes a protrusion extending downwardly from said table member into said space in said recess; and
   means for selectively releasably connecting said protrusion to said flange.

8. A turntable system for selectively accommodating different types of work pieces comprising;
   a first table means for rotatably supporting a first type of work piece about a given axis;
   a second table means for rotatably supporting a second type of work piece about said given axis;
   drive means for rotating said first table means or said second table means about the same said given axis; and
   revising means for selectively revising the operable connection between said first table means and said drive means and said second table means and said drive means whereby said system can be used for accommodating either one of said first table means or said second table means at one time.

9. A turntable system for selectively accommodating different types of work pieces comprising;
   a first table means for supporting a first type of work piece;
   a second table means for supporting a second type of work piece;
   drive means for rotating said first table means and said second table means about a common axis;
   revising means for selectively revising the operable connection between said first table means and said drive means and said second table means and said drive means whereby said system can be used for accommodating either one of said first table means or said second table means at one time; and
   said drive means being separate motors, one motor for driving a hollow shaft connected to said first table means and the other motor for driving a second shaft extending through said hollow shaft and connected to said second table means.

10. The turntable system of claim 9 in which said second table means is located over said first table means for mounting a second type of work piece on said second table for rotation by said other motor and for preventing the mounting of a first type of work piece on said first table means for rotation by said one motor and said revising means includes connecting and disconnecting means for connecting and removably disconnecting said second table means from said second shaft for removal from a location over said first table means for mounting a first type of work piece on said first table means for rotation by said one motor.

11. The turntable system of claim 10 in which said first table includes a centrally located recess;
    said second shaft including a radially extending flange at the top end thereof located in said recess; and
    means for selectively removably connecting said table member to said flange.

12. The turntable system of claim 11 in which said flange has an upper surface spaced from said support surface of said first table to provide a space in said recess above said flange and a tooling interface member is selectively located in said space in said recess and connected to said first table when work pieces mounted on said first table means and rotated by said first motor are to be treated.

13. The turntable system of claim 11 in which said flange has an upper surface spaced from said support surface of said first table to provide a space in said recess above said flange and said means for selectively connecting said table member to said flange includes a protrusion extending downwardly from said table member into said space in said recess; and means for selectively releasably connecting said protrusion to said flange.

* * * * *